(12) United States Patent
Chengottarasappan et al.

(10) Patent No.: US 8,572,407 B1
(45) Date of Patent: Oct. 29, 2013

(54) GPU ASSIST FOR STORAGE SYSTEMS

(75) Inventors: Arun Kumar Chengottarasappan, Tamilnadu (IN); Santhosh V. Kudva, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 13/075,628

(22) Filed: Mar. 30, 2011

(51) Int. Cl.
  *G06F 11/30* (2006.01)
(52) U.S. Cl.
  USPC .............................................. 713/190; 726/4
(58) Field of Classification Search
  None
  See application file for complete search history.

(56) References Cited

U.S. PATENT DOCUMENTS

| | | | |
|---|---|---|---|
| 6,434,637 B1 | 8/2002 | D'Errico | |
| 7,076,690 B1 | 7/2006 | Todd et al. | |
| 7,746,350 B1 | 6/2010 | Danilak | |
| 7,890,664 B1 | 2/2011 | Tao et al. | |
| 2009/0147849 A1* | 6/2009 | Au et al. | 375/240.13 |
| 2009/0259854 A1* | 10/2009 | Cox et al. | 713/189 |
| 2011/0161675 A1* | 6/2011 | Diard | 713/189 |
| 2012/0081377 A1* | 4/2012 | Sowerby et al. | 345/522 |

OTHER PUBLICATIONS

Harrison, et al., "AES Encryption Implementation and Analysis on Commodity Graphics Processing Units," 9th Workshop on Cryptographic Hardware and Embedded Systems (CHES 2007), Vienna, Austria, Sep. 10-13, 2007, pp. 209-226.
Harrison, et al., "AES on Graphics Processing Units: AES Encryption Implementation and Analysis on Commodity Graphics Processing Units," Slides from 9th Workshop on Cryptographic Hardware and Embedded Systems (CHES 2007), Vienna, Austria, Sep. 10-13, 2007.
Harrison, et al., "Practical Symmetric Key Cryptography on Modern Graphics Hardware," 17th Usenix Security Symposium Proceedings, pp. 195-209.
Raizen, et al., "Preserving LBA Information Between Layers of a Storage I/O Stack for LBA-Dependent Encryption," U.S. Appl. No. 12/977,971, filed Dec. 23, 2010.
Raizen, et al., "Sharing Encrypted-Related Metadata Between Multiple Layers in a Storage I/O Stack," U.S. Appl. No. 12/977,789, filed Dec. 23, 2010.
Sanders, et al., "CUDA by Example, An Introduction to General-Purpose GPU Programming," Addison-Wesley, 2011, Chapter 4, pp. 37-57.

* cited by examiner

*Primary Examiner* — Kambiz Zand
*Assistant Examiner* — Gita Faramarzi
(74) *Attorney, Agent, or Firm* — BainwoodHuang (57) ABSTRACT

A method is provided for providing, with a GPU, selective cryptographic assist to data storage operations. The method is performed by a computer, the computer having a general-purpose central processing unit (CPU) and a special-purpose processor optimized for performing vector-based calculations. The method includes (a) calculating a processing load value on the CPU as the CPU performs a set of data storage operations, (b) comparing the calculated processing load value to a threshold value, (c) if the threshold value exceeds the calculated processing load, then performing cryptographic operations related to a data storage operation of the set of data storage operations on the CPU to the exclusion of the special-purpose processor, and (d) otherwise, performing the cryptographic operations related to the data storage operation on the special-purpose processor to the exclusion of the CPU. A corresponding apparatus is also provided. A method is also provided for providing GPU-assist to sequence-detection operations.

21 Claims, 6 Drawing Sheets

GPU ASSIST FOR STORAGE SYSTEMS

BACKGROUND

Data storage systems often have particular processing needs. For example, some storage systems allow some or all data to be encrypted. Some storage systems provide a multipathing feature to allow data to travel over multiple paths before being written to disk. This may be done to allow for redundancy. It may also be done to increase bandwidth or to distribute load.

In some data storage systems, these particular processing needs are performed in software by a central processing unit (CPU). In particular, data encryption is often performed by a crypto kernel as part of the software used to control the storage system. Path selection for use with multipathing is also often performed by a multipathing module as part of the storage system software. It may be noted that path selection may also involve selecting a particular port of a storage device from a plurality of available ports.

Some storage systems make use of storage devices that incorporate read-ahead caches. These read-ahead caches read several blocks ahead of any given read operation in order to increase efficiency in sequential read operations. This efficiency results from minimizing the need to continually access the disk platters, since disk access operations are much more expensive than cache reads.

SUMMARY

The above-described approach to data storage may not be entirely optimal, because some particular data storage processing needs are cycle-intensive tasks, so, in some instances, performing these operations in software on the computer system may slow down data storage operations.

In particular, data encryption can utilize a large amount of processing resources. Therefore, it is desirable to offload encryption operations from the CPU when CPU utilization is high.

Furthermore, sequential data storage operations may be hindered by not taking advantage of read-ahead caching techniques when multipathing to different ports of a storage device using distinct caches for each port. Therefore, it is desirable to perform sequence detection operations as part of the multipathing task in order to maximize read efficiency. However, since sequence detection operations are a cycle-intensive task, it is also desirable to offload these sequence detection operations from the CPU.

Embodiments of the present invention are directed to techniques for providing, with a special-purpose processor optimized for performing vector-based calculations (such as, for example, a readily-available graphics processing unit or GPU), selective cryptographic assist to data storage operations. A method is performed by a computer, the computer having a general-purpose central processing unit (CPU) and a special-purpose processor optimized for performing vector-based calculations. The method includes (a) calculating a processing load value on the CPU as the CPU performs a set of data storage operations, (b) comparing the calculated processing load value to a threshold value, (c) if the threshold value exceeds the calculated processing load, then performing cryptographic operations related to a data storage operation of the set of data storage operations on the CPU to the exclusion of the special-purpose processor, and (d) otherwise, performing the cryptographic operations related to the data storage operation on the special-purpose processor to the exclusion of the CPU. Use of this method is beneficial because it allows cryptographic operations (which are typically highly parallelized) to be performed on a GPU at the same time that the remainder of the data storage operation processing is performed on the CPU. In addition, because the offloading of cryptographic operations to the GPU is selective (based on CPU utilization), it avoids slowing down operations when CPU utilization is low (due to inefficiencies introduced by communications and coordination between the CPU and GPU).

Embodiments of the present invention are also directed to techniques for providing special assistance to sequence-detection operations in a data storage system. A method is performed by a computer, the computer having a general-purpose central processing unit (CPU) and a special-purpose processor optimized for performing vector-based calculations. The method includes (a) performing a set of data storage READ operations on the CPU, each data storage READ operation of the set of data storage operations being directed to one data storage device of a data storage system, the one data storage device having a plurality of ports, (b) performing, on the special-purpose processor, sequence detection operations associated with the set of data storage READ operations, including sending a signal to the CPU indicating whether or not a particular data storage READ operation of the set of data storage READ operations is in-sequence with previous data storage READ operations of the set of data storage READ operations, and (c) if the CPU does not receive a signal from the special-purpose processor indicating that the particular data storage READ operation is in-sequence with previous data storage READ operations, then sending the particular data storage READ operation to a port of the plurality of ports based only on load-balancing selection criteria, and (d) if the CPU receives a signal from the special-purpose processor indicating that the particular data storage READ operation is in-sequence with previous data storage READ operations, then sending the particular data storage READ operation to a same port which processed the previous data storage READ operations. Use of this method is beneficial because it allows sequence detection operations (which are typically highly vectorized) to be performed on a GPU at the same time that the remainder of the data storage operation processing is performed on the CPU. This allows multipathing to be selectively modified to allow sequential READ operations to be aggregated at a single port of a storage device, instead of distributing such sequential READ operations among different ports of the storage device, each port having a separate read-ahead cache.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
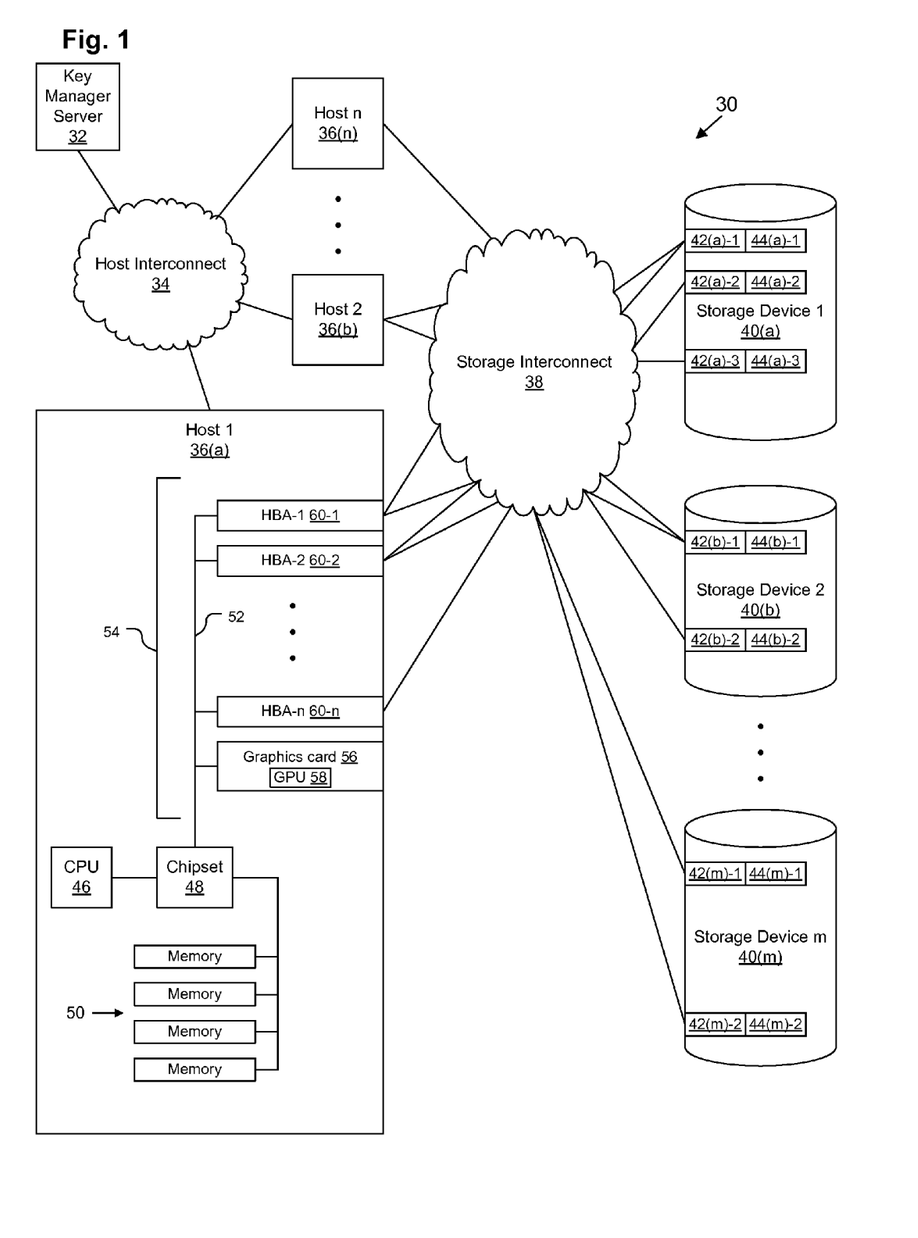
FIG. 1 depicts an example system for use in practicing various embodiments of the invention.

FIG. 1 depicts an example distributed computer system 30 capable of operating as a data storage system for use in performing various embodiments of the invention. System 30 is capable of cryptographically processing some or all data that it processes. System 30 is also capable of making use of multipathing features.

System 30 includes a key manager server 32, a host interconnect 34, and one or more hosts 36 (depicted as hosts 36(a), 36(b), . . . , 36(n)). Key manager server 32 and hosts 36 connect to each other via host interconnect 34. The hosts 36 also connect to storage devices 40 (depicted as storage devices 40(a), 40(b), . . . , 40(m)) via a storage interconnect 38. In some embodiments, the host interconnect 34 and the storage interconnect 38 are combined.

Each host 36 includes a processor (depicted as CPU 46), a controller chipset 48, memory 50, and a general-purpose bus 52 for communicating with peripherals installed in expansions slots 54. Processor 46 may be, for example, a general purpose processor or microprocessor, a central processing unit (CPU), or a set of multiple CPUs. For the purposes of this disclosure, the term CPU 46 will refer to the central processing hardware of the host 36, whether it be a single CPU or a set of multiple CPUs operating in a symmetric or asymmetric configuration. Memory 50 may be made up of one or more of the following: volatile random access memory, non-volatile read-only memory, non-volatile flash memory, magnetic storage, optical storage, etc. In one embodiment, the expansion slots 54 are compatible with the Peripheral Component Interconnect (PCI) Express standard, as is well-known in the art. Installed in at least one expansion slot is a graphics card 56, having an on-board graphics processing unit (GPU) 58. Further details of the GPU 58 are provided below, in connection with FIG. 3. Graphics cards are typically used for performing graphics calculations and other operations associated with displaying graphics on a screen. However, in the present disclosure, the graphics card 56 is used for other purposes instead (although it should be understood that in some embodiments, graphics card 56 may also be used in the typical manner in addition to performing these additional functions). Also installed in at least one expansion slot 54 are one or more host bus adapters (HBAs) 60 (depicted as HBAs 60-1, 60-2, . . . , 60-n) for connecting to storage interconnect 38 over redundant paths. Each HBA 60 connects to storage interconnect 38 through one or more paths.

Hosts 36 are computers executing applications that store data on the data storage devices 40. In addition to connecting to the host interconnect 34, each host 36 also connects to the storage interconnect 38, typically via a plurality of independent connections. In one embodiment, the hosts 36 employ a multipathing function which establishes and utilizes multiple paths from a given host 36 to a given storage device 40, which can provide higher performance as well as redundancy for greater availability.

The storage interconnect 38 can be any type of network or input/output (I/O) bus capable of interconnecting storage devices 40 with host computers 36. In some embodiments, the storage devices 40 and host 36 are interconnected in a manner such that, to the operating systems running on the hosts 36, the storage devices 40 appear as locally attached, but this is not required. The storage interconnect 38 may be a shared, public, or private network and encompasses a wide area or local area and can be implemented through any suitable combination of wired and/or wireless communication networks. Furthermore, the storage interconnect 38 may include local area network (LAN), a wide area network (WAN), an intranet, the Internet, or a set of switches. For example, in one embodiment, the storage interconnect 38 works with Fibre Channel connectivity and is implemented in the form of a storage area network (SAN). In another embodiment, the storage interconnect 38 works with internet protocol (IP) connectivity and is implemented via an Internet-Small Computer System Interface (iSCSI) (e.g., for Fibre Channel). Those of skill in the art will recognize that other implementations are, of course, possible.

Storage devices 40 may be, in some embodiments, any sort of storage equipment capable of connecting to storage interconnect 38. In some embodiments, each storage device 40 is a disk array. Examples of disk arrays include the Symmetrix Integrated Cache Disk Array System and the CLARiiON Disk Array System, both available from EMC Corp. of Hopkinton, Mass. As is well-known in the art, a typical disk array includes a disk array controller, disk enclosures holding a plurality of disk drives, and a power supply. Each storage device 40 also includes one or more ports 42 (depicted, in the case of storage device 40(a), as 42(a)-1, 42(a)-2, and 42(a)-3), each of which has one or more physical connections to storage interconnect 38. Each port also has an associated cache 44 (depicted, in the case of storage device 40(a), as 44(a)-1, 44(a)-2, and 44(a)-3), such as, for example, a read-ahead cache. In some embodiments, for every READ operation directed at a port 42, the storage device 40 reads 8 or 16 blocks of data past a last block of the READ operation and deposits the read blocks in the read-ahead cache 44.

In operation, the hosts 36 execute application programs that utilize the storage devices 40 for non-volatile data storage. The storage interconnect 38 may employ a storage-oriented protocol such as iSCSI or Fibre Channel to enable block-oriented read and write commands and the accompanying data to be transferred between the hosts 36 and storage devices 40. Additionally, the system 30 provides selective encryption of storage data by the hosts 36. The key manager server 32 and host interconnect 34 provide support for the data encryption function as described in more detail below.

Key manager server 32 provides key manager functionality, i.e., the generation, protection, storage, replacement, and elimination of data encryption keys and related data that are used in data encryption/decryption operations. In one embodiment, key manager server 32 is a server appliance. One example of a key manager server 32 usable in some embodiments is the RSA Key Manager appliance manufactured by EMC Corp. of Hopkinton, Mass. It should be understood that this is by way of example only; other products may also serve as the key manager server 32.

Key manager server 32 and hosts 36 connect to each other via host interconnect 34. Host interconnect 34 may be, for example, a network, such as a LAN or a WAN. Host interconnect 34 may also be realized by a collection of one or more switches interconnecting key manager server 32 and hosts 36.

As mentioned, key manager server 32 controls the generation, protection, storage, replacement, and elimination of data encryption keys. In particular, key manager server 32 creates encryption keys and corresponding key identifiers. Each key identifier is associated with a corresponding encryption key and can be used to obtain the key from the key manager server 32, provided that all permissions and credentials are in place.

Figure 2:
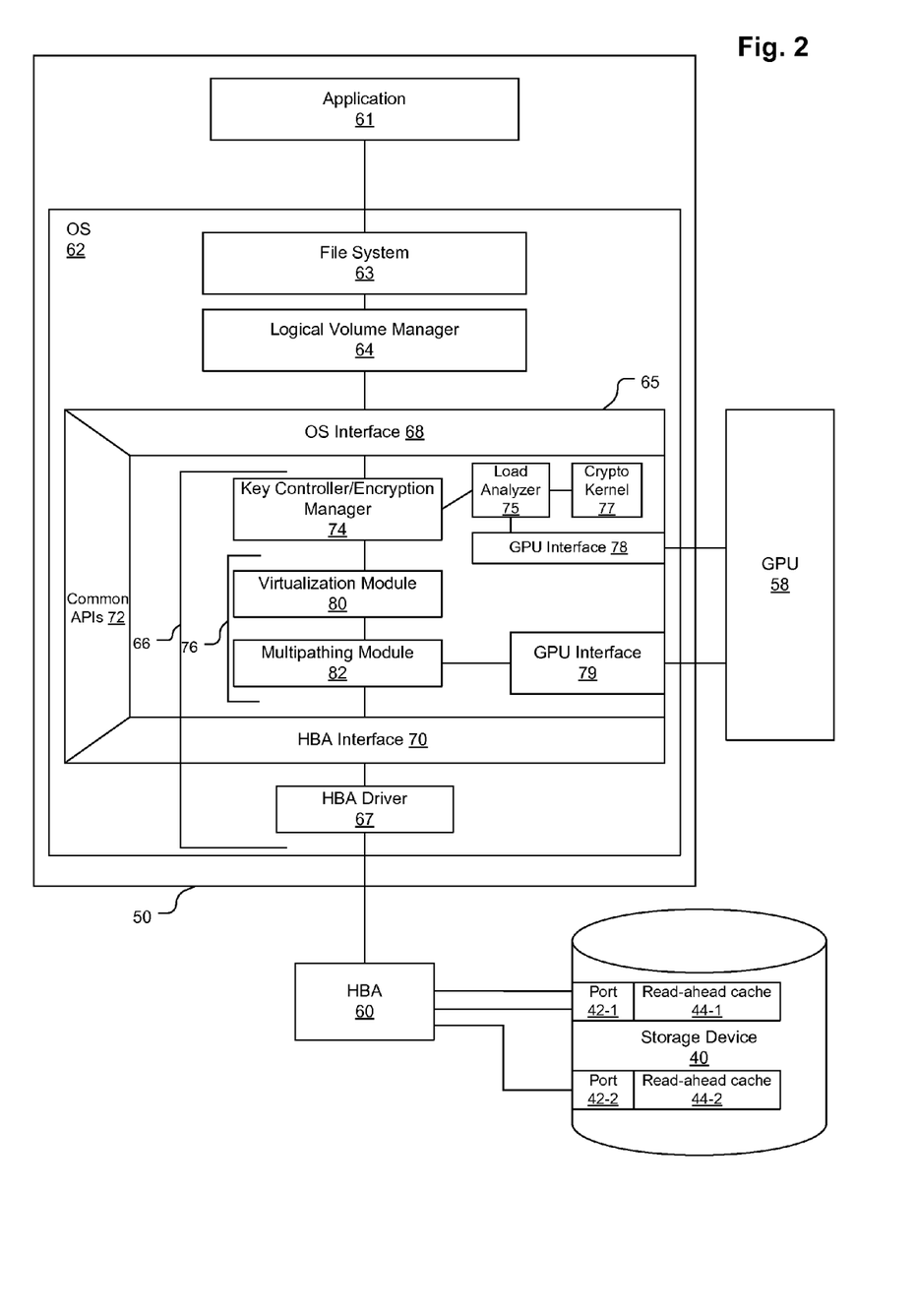
FIG. 2 depicts an example contents of host memory for use in practicing various embodiments of the invention in logical context with various external elements.

FIG. 2 illustrates certain software that is contained within the memory 50 during system operation as well as various logical connections to hardware located outside of memory 50. As shown, in one embodiment, memory 50 stores one or more computer program applications 61 and an operating system (OS) 62. Applications 61 and OS 62 contain a set of instructions to be executed by processor 46. Memory 50 may also store application data (not shown).

OS 62 (which contains many well-known components that are not shown or described herein) includes a file system 63 and a logical volume manager 64. OS 62 also includes an input/output (I/O) filter driver 65 and an HBA driver 67. I/O filter driver 65 may be, for example, a component of the PowerPath Encryption With RSA software available from EMC Corp. of Hopkinton, Mass. I/O filter driver 65 includes an OS interface 68, an HBA interface 70, and a set of common application programming interfaces (APIs) 72. I/O filter driver 65 also includes a key controller module (KCM) or encryption manager 74 and one or more intermediate layers (IL) 76. ILs 76 may include, for example, one or more virtualization modules 80 and multipathing modules 82. Load analyzer 75, crypto kernel 77, and GPU interfaces 78, 79 may also be considered to be part of I/O filter driver 65. Portions of the I/O filter driver 65 and the HBA driver 67 may also make up a storage I/O stack 66. It should be understood that this arrangement is by way of example only; in some embodiments, one or more components of the storage I/O stack 66 may be external to the I/O filter driver 65. HBA driver 67 is in communication with one or more HBA 60 to provide communication with storage devices 40.

The KCM 74 is generally responsible for managing the data encryption aspects of operation of the host 36 in which it resides. In some arrangements, the KCM 74 may arrange for the encryption to be performed by crypto kernel 77. However, since crypto kernel 84 runs in software (running on processor 46), such operation may impose a performance penalty in terms of latency and/or throughput of data storage operations. Therefore, in some arrangements, KCM 74 is able to arrange for all or a portion of the encryption to be performed by the GPU 58. In particular, load analyzer 75 determines if the CPU utilization of processor 46 exceeds a threshold, in which case, KCM 74 offloads cryptographic processing to the GPU 58 via GPU interface 78. This is particularly beneficial because a GPU is designed as a highly-parallel processor, which is optimized to perform similar operations on different data in parallel, which is beneficial in the case of cryptographic processing of large segments of data.

Multipathing module 82 distributes data storage operations, which are each directed at a particular data storage device 40(x), between the various ports 42(x) of that device 40(x). Typically, multipathing module 82 distributes the data storage operations between the ports 42(x) using a load-balancing approach, so that each port bears an approximately equal share of the workload. Multipathing module 82 also distributes all data storage operations directed at a particular port 42(x)-p between the various available paths to that port and between the various HBAs 60 to process the operations, also using a load-balancing approach.

In some embodiments, multipathing module 82 may offload certain operations to GPU 58 as well. In particular, since sequential READ operations (i.e., READ operations that are directed to areas of a storage device 40 that are closely in-sequence with each other) may benefit from the read-ahead caching provided by cache 44, it is beneficial to send sequential read operations across paths that terminate in the same port 42, rather than evenly distributing these operations across multiple ports 42. Doing this may require sequence-detection for READ operations. However, since sequence-detection is a cycle-intensive task, it would generally not be efficient to overburden the CPU 46 with performing sequence-detection. Therefore, in some embodiments, multipathing module 82 offloads sequence-detection operations to the GPU 58 via GPU interface 79.

Figure 3:
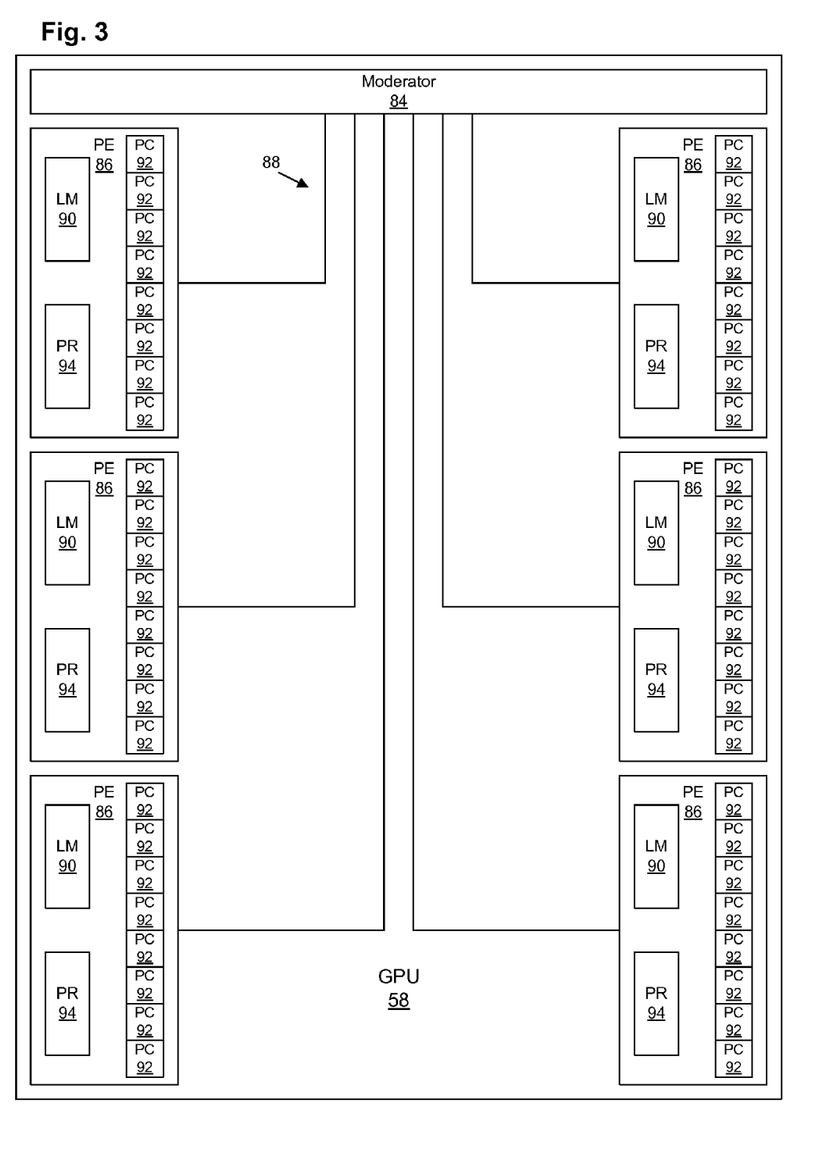
FIG. 3 depicts an example GPU for use in practicing various embodiments of the invention.

FIG. 3 depicts an example GPU 58 for use with various embodiments. A suitable GPU 58 for use with present embodiments is a high-speed, highly-parallel GPU 58, optimized for performing vector calculations with stream processing. For example, one GPU 58 for use in one embodiment may have 512 unified shader processors, distributed across 16 streaming multiprocessors or processing elements. Thus, for example, each processing element may be configured to perform one operation on 32 simultaneous sets of data. An example GPU for use with the present invention may be the GeForce GTX 580 produced by the Nvidia Corporation of Santa Clara, Calif. or the Radeon HD 6970 produced by Advanced Micro Devices, Inc. of Sunnyvale, Calif.

GPU 58 includes a moderator 84 which is connected to a plurality of processing elements (PEs) 86 over an internal bus 88. Each PE 86 includes a local moderator (LM) 90, a plurality of processor cores (PCs) 92, and a set of processing registers (PR) 94. GPU 58 also includes additional standard components, not depicted. As depicted, GPU 58 includes six PEs 86, each of which has eight PCs 92, which allows six simultaneous operations to be performed, each operation operating on up to eight pieces of data. It should be understood, that the depicted number of PEs 86 and PCs 92 is by example only. Any number of PEs 86 and PCs 92 may be used, such as, for example, 32 PEs 86, each PE 86 having 64 PCs 92. Moderator 84 functions to distribute data and instructions to the various PEs 86 and to assemble output data into meaningful form. LMs 90 also serve a similar function, distributing data and instructions to the local PCs 92 and PRs 94 of that PE 86.

Because, in the present disclosure, GPU 58 is used primarily for non-graphical processing, all (or most) PEs 86 are available for performing non-graphical operations. GPU 58 is utilized herein for general-purpose computing on graphics processing units (GPGPU). Therefore, GPU 58 preferably supports one or more GPGPU programming libraries, such as, for example, OpenCL, DirectCompute, CUDA, or Stream. Use of one of these libraries allows a programmer to easily program the GPU 58 to perform kernels (functions) on streams of data elements.

Figure 4:
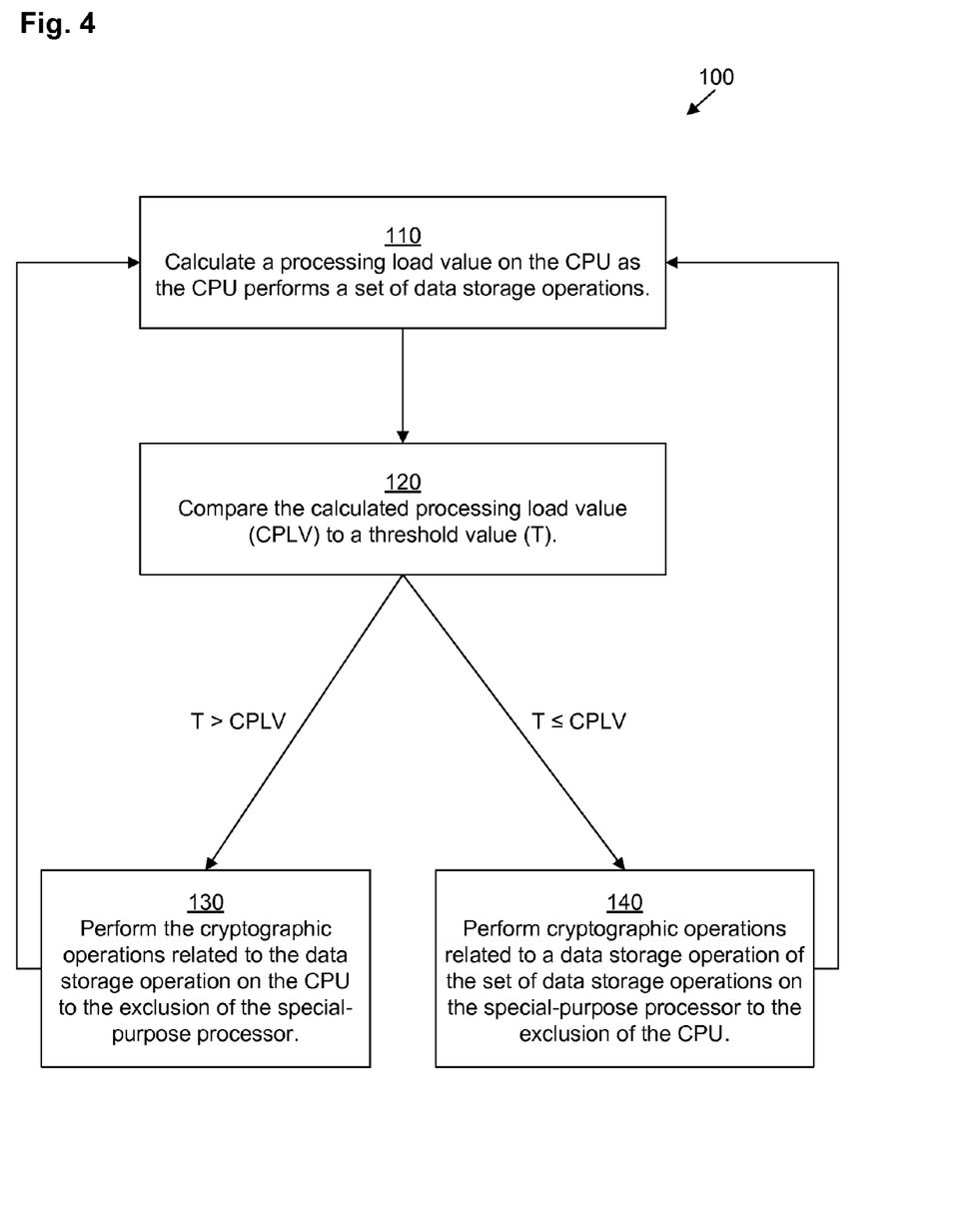
FIG. 4 depicts an example method according to one embodiment of the invention.

FIG. 4 depicts an example method 100 according to one embodiment. Method 100 is performed by a host 36, such as host 36(a), as depicted in FIG. 1, with a memory 50 configured as in FIG. 2. In method 100, host 36 is able to perform data storage operations with part-time GPU-based encryption-assist as needed. It should be understood that the term "cryptographic processing" can refer to encrypting data, decrypting data, or both.

In step 110, load analyzer 75 (which runs on CPU 46) calculates a processing load value (hereinafter referred to as a CPLV—a calculated processing load value) of the CPU 46 as the CPU 46 performs data storage operations. The CPLV represents a percentage of the total processing capacity of the CPU 46 being used, as is well-known in the art. In some embodiments, step 110 is not performed by load analyzer 75, or even by any component of the storage I/O stack 66 or the I/O filter driver 65. Rather, in some embodiments, a module built into the OS 62 continually performs CPLV calculations.

In step 120, load analyzer 75 (again, running on CPU 46) compares the CPLV to a threshold value T, and selectively proceeds to choose either step 130 or step 140 based on the comparison in order to maximize performance, as described in further detail below. If the threshold T exceeds the CPLV, then load analyzer proceeds to choose step 130. However, if the CPLV exceeds the threshold T, then load analyzer proceeds to choose step 140 instead.

Threshold T represents a maximum CPU utilization below which it is desirable for the CPU 46 to perform cryptographic processing related to the data storage operations, but above which, it is desirable for the GPU 58 to perform cryptographic processing related to the data storage operations. It should be understood that there is a performance penalty generated by performing the encryption on the GPU 58, due to overhead generated by the large amount of data necessary to transmit back-and-forth across system bus 52. Therefore, it is best to perform the cryptographic processing on the GPU 58 when the load on the CPU 46 would otherwise reach 100% and the performance of the data storage operations would be slowed down enough to overcome the bus overhead. Thus, the threshold T should ideally be calculated so as approximately yield that result.

In some embodiments, threshold T is a fixed value, such as 90%, while in other embodiments, threshold T is a value dependent on the speed of the CPU 46. For example, on a single-core 3 GHz processor, the threshold T may equal 25%, while on a quad-core 3 GHz processor, the threshold T may equal 90%. In yet another embodiment, the threshold T may be dynamically calculated based on the number of applications the CPU 46 is running.

It should be understood that, although step 130 has been depicted as being performed when T>CPLV and step 140 when T≤CPLV, in some embodiments, step 130 may be performed when T≥CPLV and step 140 when T<CPLV.

In step 130, crypto kernel 77 performs all of the cryptographic processing related to a data storage operation on the CPU 46 instead of on the GPU 58. Although the GPU 58 is much more highly parallelized than the CPU 46, the CPU 46 can, most likely, perform individual mathematical operations faster than the GPU 58.

In step 140, the GPU 58 performs cryptographic processing related to the data storage operation instead of the CPU 46 performing this cryptographic processing. It should be understood that the CPU 46 may perform some tasks related to the cryptographic processing (such as sending the appropriate data to the GPU 58 and aggregating results generated by the GPU 58), but the underlying cryptographic calculations are performed on the GPU 58.

The GPU 58 is well-suited to performing cryptographic operations on data storage operations because these cryptographic operations typically involve performing independent operations on large sets of data in parallel. For example, using a block-cipher approach, since every block of data (e.g., 128 bits or 16 bytes of data) is processed independently, the parallelism of the GPU 58 can be exploited. In some encryption schemes, such as the well-known Advanced Encryption Standard (AES), parallelism can be exploited within blocks. For example, in AES, each block is converted into a 4×4 matrix, and, for at least some operations within the cryptographic processing, individual cells (or other partitioned areas, such as rows or columns) can be independently processed according to the AES algorithm (for example, by XORing each partitioned area with an encryption key or a value derived from an encryption key). Partitioning of the data among various PEs 86 may be performed by moderator 84, and partitioning of data within each PE 86 may be performed by LM 90. Thus, in one simple example, if GPU 58 has 16 PEs 86, each of which contains 16 PCs 92, moderator 84 may break up the data into individual 128-bit blocks and send each of 16 128-bit blocks to a separate PE 86, allowing 16×128=2048 bits=256 bytes of data to be encrypted at once. Within each PE 86, LM 90 may partition the 128-bit block into 16 8-bit cells, each of which may be processed by a separate PC 92 in parallel making use of registers PR 94 using the same execution kernel. Alternatively, since each PC 92 is generally able to process 32 bits of data, moderator 84 may instead send four blocks of data to each PE 86, and then the LM 90 of each PE 86 would partition the data of each block into 4-cell groups of 32 bits each, allowing each PC 92 to process each 4-cell group in parallel. In this second example, 4×16×128=8192 bits=1024 bytes=1 kilobyte of data may be encrypted at once. Using a more advanced GPU 58 would permit even larger chunks of data to be cryptographically processed at a time.

It should be understood that steps 110 and 120 may be repeated continuously, periodically, or upon certain triggers. For example, in one embodiment, step 120 may be performed once per storage operation, prior to engaging in that particular data storage operation. In that case, some data storage operations might utilize the GPU 58 for cryptographic processing, while other data storage operations might simultaneously utilize the crypto kernel 77 for such cryptographic processing. That could happen if, for example, at the beginning of operation 1, the CPLV is 91% (assuming a threshold of 90%), upon which the cryptographic processing for operation 1 is sent to the GPU 58. While the GPU 58 is still engaging in cryptographically processing operation 1, CPU 46 may begin processing data storage operation 2. CPU 46 would then perform steps 110 and 120 again. At that point, if the CPLV had dropped to 89%, then the CPU 46 would undertake cryptographic processing of operation 2 (via crypto kernel 77). Thus, CPU 46 would be performing cryptographic processing of operation 2 at the same time that GPU 58 would be performing cryptographic processing of operation 1, since multiple data storage operations are performed at once in parallel As an additional example, in another embodiment, step 120 may be performed at periodic intervals, such as once every 10 seconds. In that case, all data storage operations generated within the 10 seconds after a first performance of step 120 might be sent to the GPU 58 for cryptographic processing, while all data storage operations performed in the subsequent 10 seconds (performed after a second performance of step 120, with an opposite evaluation result) might be sent to the crypto kernel 77 for cryptographic processing. It should be understood that 10 seconds is given by way of example only. In some embodiments, the periodic intervals may be in the range of 1 second to 100 seconds. In some embodiments, the periodic interval is pre-selected and programmed into the software, while in other embodiments, the periodic interval is a user-selectable value at run-time.

Figure 5:
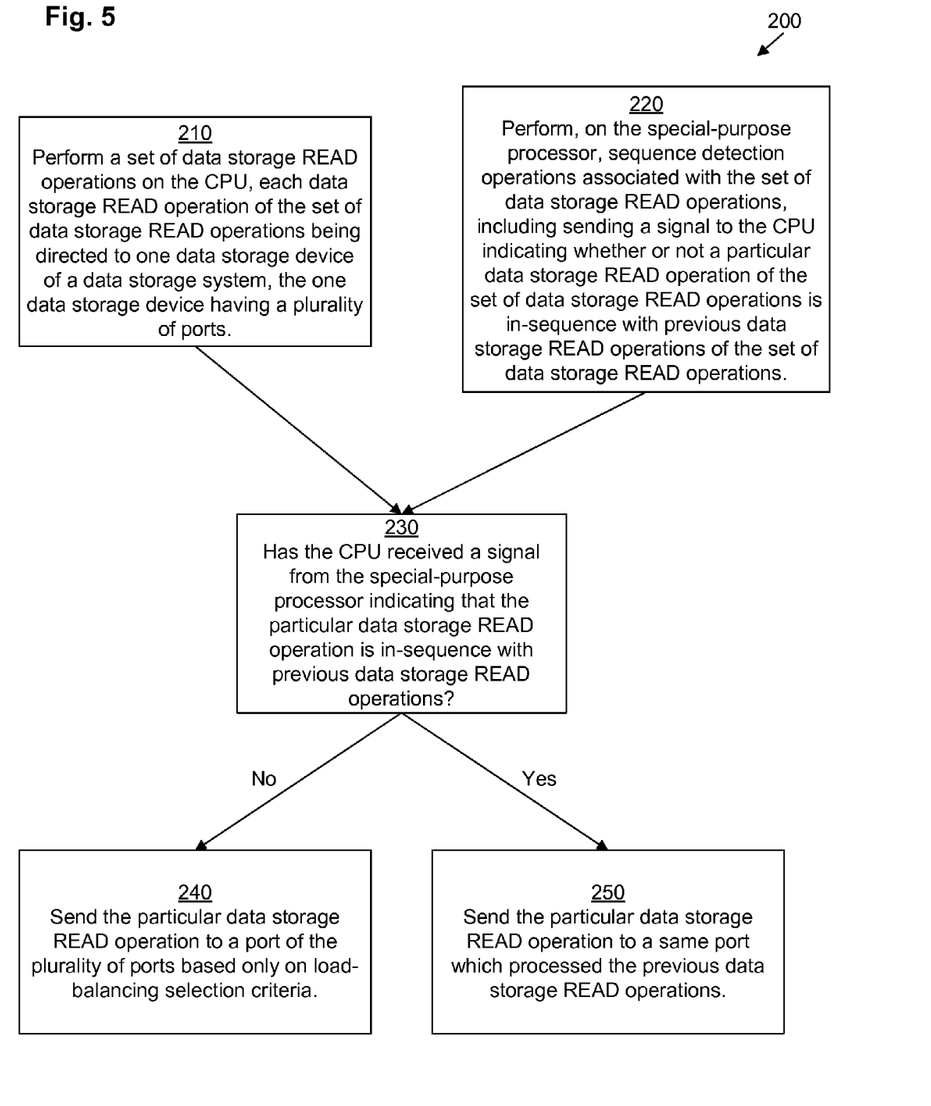
FIG. 5 depicts an example method according to one embodiment of the invention.

Some embodiments are directed towards sequence detection. FIG. 5 depicts an example method 200 according to one embodiment. Method 200 is performed by a host 36, such as host 36(a), as depicted in FIG. 1, with a memory 50 configured as in FIG. 2. In method 200, host 36 is able to perform data storage READ operations with GPU-assisted sequence-detection. It should be noted that, in some embodiments, data storage WRITE operations (and other non-READ operations) may not make use of this method 200, since they do not need to benefit from read-ahead caching. Therefore, multipathing module 82 (running on CPU 46) is free to assign data storage WRITE operations to any port 42 based on availability and load-balancing criteria.

In step 210, CPU 46 performs a set of data storage READ operations, each data storage READ operation of the set of data storage operations being directed to one data storage device 40(x) of a data storage system. It should be understood that, in some embodiments, the READ operation may be specifically targeted at a particular logical disk mapped to the storage device 40(x); it will be appreciated that the general principles apply in an equivalent manner to these embodiments. A typical data storage READ operation is associated with a block-start value and a length of the operation (in blocks). In some embodiments, a block-end value (which is equivalent to the block-start value plus the length minus 1) may replace the length. The READ operation directs the storage device 40(x) to READ from the address of the block-start value through the address of the block-end value.

In step 220, GPU 58 performs sequence detection operations associated with the set of data storage READ operations. This step is performed simultaneously with step 210. As part of this step, GPU interface 79 sends certain information about the data storage READ operations (such as a list of block start locations for the current READ operation and a set of previous READ operations directed to the same storage device 40(x)) to GPU 58, GPU 58 performs the actual sequence-detection, and then GPU 58 sends a signal to the CPU 46 indicating whether or not a particular data storage READ operation of the set of data storage READ operations is in-sequence with previous data storage READ operations of the set of data storage READ operations. In some embodiments, the GPU 58 sets a flag (e.g., SeqFlag, stored in memory 50, but also transmitted back and forth between memory 50 and memory on graphics card 56) associated with a particular storage device 40(x) to ON when data storage READ operations directed at that storage device 40(x) are sequential, and sets the flag to OFF when data storage READ operations directed at that storage device 40(x) are not sequential.

Figure 6A:
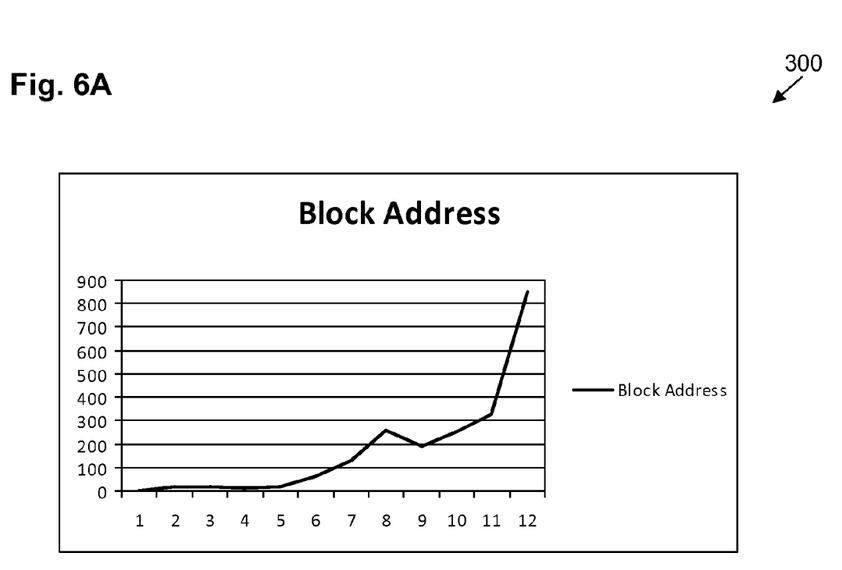
FIG. 6A depicts an example graph of data to illustrate one embodiment of the invention.
Figure 6B:
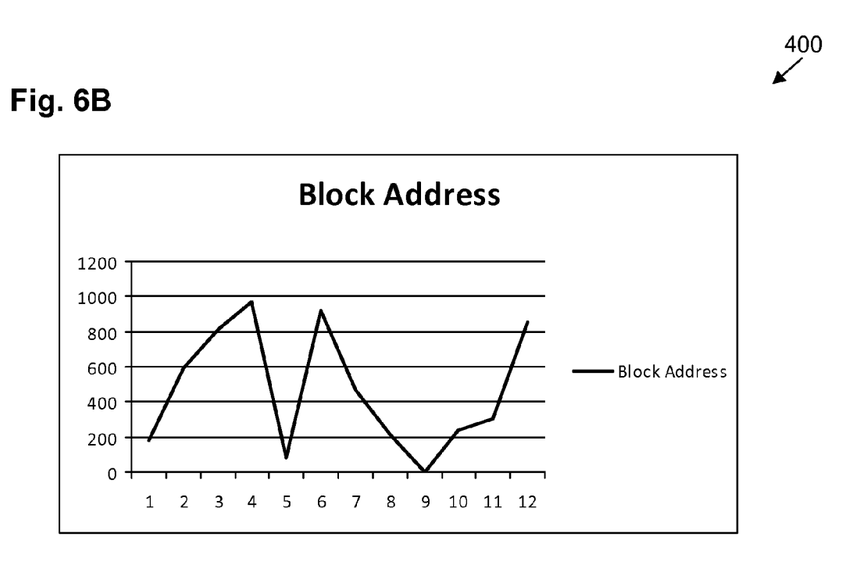
FIG. 6B depicts an example graph of data to illustrate one embodiment of the invention.

These sequence-detection operations are vector-based operations that take advantage of the highly-parallelized design of the GPU 58, which is optimized for performing vector calculations. Various vector-based sequence-detection operations (including various well-known vector-based sequence-detection operations) may be utilized. In some embodiments, a particular sequence-detection algorithm, described below, with reference to FIG. 6, may be used.

In step 230, the multipathing module 82 (running on CPU 46) reads the value of SeqFlag for the data storage device 40(x) to which a particular data storage READ operation is directed, and if SeqFlag is OFF (i.e., the data storage READ operation is not sequential with previous data storage READ operations directed at that data storage device 40(x)), then it proceeds to execute step 240, while, if SeqFlag is ON (i.e., the data storage READ operation is sequential with previous data storage READ operations directed at that data storage device 40(x)), then it proceeds to execute step 250.

In step 240, multipathing module 82 directs the data storage READ operation towards any available port 42(x)-q of the data storage device 40(x) without regard to which port 42(x)-p processed the previous data storage READ operation directed towards that data storage device. In particular, the multipathing module chooses port 42(x)-q based on load-balancing selection criteria, as is well-known in the art.

In step 250, multipathing module 82 directs the data storage READ operation towards whichever port 42(x)-p of the data storage device 40(x) processed the previous data storage READ operation directed towards that data storage device 40(x). Multipathing module 82 does this step without regard to load-balancing. This allows the data storage device 40(x) to take advantage of the read-ahead caching provided by cache 44(x)-p. However, multipathing module 82 is still free to select any available path between the host 36 and that port 42(x)-p based on load-balancing selection criteria.

Returning to step 220, the sequence-detection may be performed by the GPU 58 in the following manner. For each data storage READ operation directed to a particular data storage device 40(x), if the SeqFlag is already set ON, then it is determined if the current data storage READ operation is in-sequence with the previous sequential READ operations. In making this determination, GPU 58 makes use of READ operation data from the last p (e.g., the last 12) READ operations directed to that particular data storage device 40(x) (or, instead from the past q seconds—for example, 10 seconds), or since the SeqFlag was last changed from OFF to ON, whichever period is shorter. Between each READ operation to be considered (let us say that there are p such READ operations), the GPU calculates the slope of READ block-start values plotted against the successive READ operation numbers. READ block-end values are typically ignored. In one embodiment, as long as the slopes remain substantially of the same sign (positive or negative) and no slope is greater than an upper threshold value (UTV) or less than a lower threshold value (LTV), the READ operations are considered to be sequential. In one embodiment, the slopes are said to remain substantially of the same sign as long as there are no more than two inflection points (changes of sign in the slope) over any set of 5 READ operations in a row. In some embodiments, slope values are mathematically smoothed before being compared, in order to reduce the effect of outlier operations.

For example, FIG. 6A depicts a graph 300 of example data that may be used in performing method 200. Graph 300 corresponds to the data in Table 1, below.

TABLE 1

| Request # - X | Time Period | Block Start - Y | Block End | Y2-Y1 | X2-X1 | Slope |
|---|---|---|---|---|---|---|
| 1 | 0 | 0 | 10 | | | |
| 2 | 1 | 20 | 30 | 20.00 | 1 | 20 |
| 3 | 2 | 16 | 32 | -4.00 | 1 | -4 |
| 4 | 3 | 14 | 28 | -2.00 | 1 | -2 |
| 5 | 4 | 18 | 36 | 4.00 | 1 | 4 |
| 6 | 5 | 64 | 128 | 46.00 | 1 | 46 |
| 7 | 6 | 128 | 256 | 64.00 | 1 | 64 |
| 8 | 10 | 256 | 512 | 128.00 | 1 | 128 |
| 9 | 20 | 192 | 256 | -64.00 | 1 | -64 |
| 10 | 25 | 250 | 512 | 58.00 | 1 | 58 |
| 11 | 26 | 328 | 456 | 78.00 | 1 | 78 |
| 12 | 30 | 850 | 1024 | 522.00 | 1 | 522 |

Table 1 depicts an example set of substantially sequential READ operations and associated information. As an illustration, GPU 58 calculates the slope between requests 4 and 5 by calculating Y2-Y1, which corresponds to the difference in READ block start values between rows 4 and 5, which is 18-14=4. Then, GPU 58 is able to calculate the slope as (Y2-Y1)/(X2-X1)=(18-14)/(5-4)=4 (where the X values correspond to the request numbers and the Y values correspond to the block-start values).

Recall that, in one embodiment, the slopes are said to remain substantially of the same sign as long as there are no more than two inflection points (changes of sign in the slope) over any set of 5 READ operations in a row. Thus, in Table 1, since inflection points exist at READ requests 3, 5, 9, and 10, and since there is no group of 5 sequential READ requests in the range 1-11 that have more than 2 inflection points (and since no positive slopes are less than the UTV and no negative slopes exceed the LTV), all points in Table 1 from 1 to 11 may be considered sequential in one embodiment.

As long as the slopes remain substantially of the same sign and no slope is greater than the UTV (e.g., 64) or less than the LTV (e.g., −128), the READ operations are considered to be sequential. However, in one embodiment, smoothing is used, as follows to allow for occasional discrepancies.

For example, in one embodiment, GPU 58 may establish a (p−1)x2 matrix to smooth out the results over the last p READ operations. For p=12 as in Table 1, an 11x2 matrix is used. Each row of the matrix contains two Block start values to enable computation of a local slope Y2−Y1. Thus, the matrix for Table 1 would be {(0, 20), (20, 16), (16, 14), (14, 18), (18, 64), (64, 128), (128, 256), (256, 192), (192, 250), (250, 328), (328, 850)}. The slopes for each row can be calculated in parallel using the GPU 58, yielding slopes s2, s3, . . . , s12. An 11x3 matrix can now be constructed with each row having the UTV, LTV, and a slope. For example, row 1 would be (UTV, LTV, s2)=(64, −128, 20) while row 11 would be (UTV, LTV, s12)=(64, −128, 522). This matrix can also be processed in parallel on the GPU 58 by determining if the slope falls between the LTV and UTV for each row. If it falls within the range of LTV . . . UTV, then return 0. Otherwise return 1. This yields an array of bit values. For example, in the case of Table 1, the array is {0, 0, 0, 0, 0, 0, 1, 0, 0, 1, 1}. Preliminarily, the values can be added up, and if the values sum to less than 5, the SeqFlag would be set to ON. If the values sum to at least 5, it may be determined if there are at least five 1's in a row, in which case the SeqFlag would be set to OFF. Otherwise, the SeqFlag would be set to ON.

Once the SeqFlag is set to OFF, in order to turn it back ON, the GPU 58 examines data since the last inflection point. Once it finds three READ requests in a row that have the same sign and fall within the constraints of the upper threshold and the lower threshold, the SeqFlag may be set back to ON. SeqFlag is typically initially set to ON.

FIG. 6B depicts a graph 400 of example data that may be used in performing method 200. Graph 400 corresponds to the data in Table 2, below.

TABLE 2

| Request # - X | Time Period | Block Start - Y | Block End | Y2-Y1 | X2-X1 | Slope |
|---|---|---|---|---|---|---|
| 1 | 0 | 181 | 181 | | | |
| 2 | 1 | 593 | 594 | 412.00 | 1 | 412 |
| 3 | 2 | 812 | 814 | 219.00 | 1 | 219 |
| 4 | 3 | 968 | 971 | 156.00 | 1 | 156 |
| 5 | 4 | 83 | 87 | −885.00 | 1 | −885 |
| 6 | 5 | 920 | 925 | 837.00 | 1 | 837 |
| 7 | 6 | 472 | 478 | −448.00 | 1 | −448 |
| 8 | 10 | 217 | 227 | −255.00 | 1 | −255 |
| 9 | 20 | 4 | 24 | −213.00 | 1 | −213 |
| 10 | 25 | 239 | 264 | 235.00 | 1 | 235 |
| 11 | 26 | 301 | 327 | 62.00 | 1 | 62 |
| 12 | 30 | 856 | 1024 | 555.00 | 1 | 555 |

Table 2 depicts an example set of substantially non-sequential READ operations and associated information. Performing the same example approach as illustrated above with respect to Table 1, the final array would be {1, 1, 1, 1, 1, 1, 1, 1, 1, 0, 1}, which indicates non-sequentiality.

GPU 58 performs these sequence-detection operations by performing all of the necessary slope calculations and smoothing operations in parallel, taking advantage of the multiple PEs 86 and PCs 92 on the GPU 58.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computer, the computer having a general-purpose central processing unit (CPU) and a special-purpose processor optimized for performing vector-based calculations, the method comprising:
    calculating a processing load value on the CPU as the CPU performs a set of data storage operations, thereby generating a calculated processing load value;
    comparing the calculated processing load value to a threshold value;
    if the threshold value exceeds the calculated processing load, then performing cryptographic operations related to a data storage operation of the set of data storage operations on the CPU to the exclusion of the special-purpose processor; and
    otherwise, performing the cryptographic operations related to the data storage operation on the special-purpose processor to the exclusion of the CPU.

2. The method of claim 1 wherein:
    the special-purpose processor is a graphics processing unit (GPU) installed on an add-in graphics card connected to the CPU via a general-purpose bus; and
    performing the cryptographic operations related to the data storage operation on the special-purpose processor includes sending data associated with the cryptographic operations between the GPU and the CPU via the general-purpose bus.

3. The method of claim 2 wherein performing the cryptographic operations related to the data storage operation on the special-purpose processor includes performing the following steps on the GPU:
    segmenting, at a moderator of the GPU, data of the data storage operation into a plurality of blocks;
    sending, from the moderator to a first processing element of the GPU:
        a first block of the plurality of blocks in a first stream; and
        a first kernel, the first kernel having instructions for processing the first stream on the first processing element; and sending, from the moderator to a second processing element of the GPU, the second processing element being distinct from the first processing element:
- a second block of the plurality of blocks in a second stream, the second block being distinct from the first block, and the second stream being distinct from the first stream; and
- a second kernel, the second kernel having instructions for processing the second stream on the second processing element;

at the first processing element, applying the first kernel to each element of the first stream in a parallel manner; and at the second processing element, applying the second kernel to each element of the second stream in a parallel manner.

4. The method of claim 3 wherein the instructions of the first kernel are configured to cause the first processing element to:
- at a local moderator of the first processing element, create a 2-dimensional matrix based on the first block;
- at the local moderator, partition the matrix into a plurality of values;
- send each value of the plurality of values to a respective distinct processing core of a plurality of processing cores of the first processing element; and
- simultaneously, at each processing core of the plurality of processing cores, process each respective value according a set of rules associated with an encryption key.

5. The method of claim 1 wherein performing the cryptographic operations related to the data storage operation includes one of (a) encrypting data to be written in the data storage operation and (b) decrypting data read in the data storage operation.

6. The method of claim 1 wherein:
- calculating the processing load on the CPU and comparing the calculated processing load to the threshold value are repeated at periodic intervals, thereby generating repeated comparisons and repeated calculated processing loads; and
- upon performing a repeated comparison between the calculated processing load and the threshold value:
  - if the repeated calculated processing load exceeds the threshold value, then performing subsequent cryptographic operations related to the data storage operation on the special-purpose processor to the exclusion of the CPU; and
  - otherwise, performing the subsequent cryptographic operations related to the data storage operation on the CPU to the exclusion of the special-purpose processor.

7. The method of claim 6 where the length of the periodic intervals is in the range of 1 second to 100 seconds.

8. The method of claim 1 wherein:
- calculating the processing load on the CPU and comparing the calculated processing load to the threshold value are repeated once per data storage operation of the set of data storage operations, thereby generating repeated comparisons and repeated calculated processing loads; and
- upon performing a repeated comparison between the calculated processing load and the threshold value for a subsequent data storage operation of the set of data storage operations:
  - if the repeated calculated processing load exceeds the threshold value, then performing cryptographic operations related to the subsequent data storage operation on the special-purpose processor to the exclusion of the CPU; and
  - otherwise, performing the cryptographic operations related to the subsequent data storage operation on the CPU to the exclusion of the special-purpose processor.

9. The method of claim 1 wherein:
the set of data storage operations is a set of data storage READ operations, each data storage READ operation of the set of data storage READ operations being directed to one data storage device of a data storage system, the one data storage device having a plurality of ports; and
the method further comprises:
- performing, on the special-purpose processor, sequence detection operations associated with the set of data storage READ operations, including sending a signal to the CPU indicating whether or not a particular data storage READ operation of the set of data storage READ operations is in-sequence with previous data storage READ operations of the set of data storage READ operations; and
- if the CPU does not receive a signal from the special-purpose processor indicating that the particular data storage READ operation is in-sequence with previous data storage READ operations, then sending the particular data storage READ operation to a port of the plurality of ports based only on load-balancing selection criteria; and
- if the CPU receives a signal from the special-purpose processor indicating that the particular data storage READ operation is in-sequence with previous data storage READ operations, then sending the particular data storage READ operation to a same port which processed the previous data storage READ operations.

10. A method performed by a computer, the computer having a general-purpose central processing unit (CPU) and a special-purpose processor optimized for performing vector-based calculations, the method comprising:
- performing a set of data storage READ operations on the CPU, each data storage READ operation of the set of data storage operations being directed to one data storage device of a data storage system, the one data storage device having a plurality of ports;
- performing, on the special-purpose processor, sequence detection operations associated with the set of data storage READ operations, including sending a signal to the CPU indicating whether or not a particular data storage READ operation of the set of data storage READ operations is in-sequence with previous data storage READ operations of the set of data storage READ operations; and
- if the CPU does not receive a signal from the special-purpose processor indicating that the particular data storage READ operation is in-sequence with previous data storage READ operations, then sending the particular data storage READ operation to a port of the plurality of ports based only on load-balancing selection criteria; and
- if the CPU receives a signal from the special-purpose processor indicating that the particular data storage READ operation is in-sequence with previous data storage READ operations, then sending the particular data storage READ operation to a same port which processed the previous data storage READ operations.

11. The method of claim 10 wherein:
the special-purpose processor is a graphics processing unit (GPU) installed on an add-in graphics card connected to the CPU via a general-purpose bus; and
performing the sequence detection operations on the special-purpose processor includes sending block-start values of the particular data storage READ operation and previous data storage READ operations from the CPU to the GPU via the general-purpose bus.

12. The method of claim 11 wherein performing the sequence detection operations on the special-purpose processor includes performing the following steps on the GPU:
calculating, in parallel, a set of n−1 slopes from a set of n input points on a 2-dimensional graph, plotting operation numbers against block-start values;
performing, in parallel, a smoothing operation across the set of slopes to form a set of smoothed slopes; and
evaluating the sequentiality of the set of n input points based on the set of smoothed slopes.

13. The method of claim 10 wherein the method further comprises:
calculating a processing load value on the CPU as the CPU performs the set of data storage READ operations;
comparing the calculated processing load value to a threshold value;
if the calculated processing load exceeds the threshold value, then performing cryptographic operations related to a data storage READ operation of the set of data storage READ operations on the special-purpose processor to the exclusion of the CPU; and
otherwise, performing the cryptographic operations related to the data storage READ operation on the CPU to the exclusion of the special-purpose processor.

14. An apparatus comprising:
a general-purpose central processing unit (CPU);
a special-purpose processor optimized for performing vector-based calculations; and
memory, the memory storing a set of instructions, which, when performed by the CPU cause the CPU to:
calculate a processing load value on the CPU as the CPU performs a set of data storage operations;
compare the calculated processing load value to a threshold value;
if the calculated processing load exceeds the threshold value, then cause the special-purpose processor to perform cryptographic operations related to a data storage operation of the set of data storage operations to the exclusion of the CPU; and
otherwise, perform the cryptographic operations related to the data storage operation on the CPU to the exclusion of the special-purpose processor.

15. The apparatus of claim 14 wherein:
the apparatus further comprises a general-purpose bus connecting the CPU and memory to a set of expansion slots; and
the special-purpose processor is a graphics processing unit (GPU) installed on an add-in graphics card installed in an expansion slot of the set of expansion slots.

16. The apparatus of claim 15 wherein the GPU is configured to, when caused by the CPU to perform the cryptographic operations related to the data storage operation:
segment, at a moderator of the GPU, data of the data storage operation into a plurality of blocks;
send, from the moderator to a first processing element of the GPU:
a first block of the plurality of blocks in a first stream; and
a first kernel, the first kernel having instructions for processing the first stream on the first processing element; and
send, from the moderator to a second processing element of the GPU, the second processing element being distinct from the first processing element:
a second block of the plurality of blocks in a second stream, the second block being distinct from the first block, and the second stream being distinct from the first stream; and
a second kernel, the second kernel having instructions for processing the second stream on the second processing element;
at the first processing element, apply the first kernel to each element of the first stream in a parallel manner; and
at the second processing element, apply the second kernel to each element of the second stream in a parallel manner.

17. The apparatus of claim 16 wherein the instructions of the first kernel are configured to cause the first processing element to:
at a local moderator of the first processing element, create a 2-dimensional matrix based on the first block;
at the local moderator, partition the matrix into a plurality of values;
send each value of the plurality of values to a respective distinct processing core of a plurality of processing cores of the first processing element; and
simultaneously, at each processing core of the plurality of processing cores, process each respective value according a set of rules associated with an encryption key.

18. The apparatus of claim 14 wherein:
the instructions to calculate the processing load on the CPU and compare the calculated processing load to the threshold value are configured to be repeated at periodic intervals, thereby generating repeated comparisons and repeated calculated processing loads; and
the memory further stores a set of instructions, which, when performed by the CPU cause the CPU to, upon performing a repeated comparison between the calculated processing load and the threshold value:
if the repeated calculated processing load exceeds the threshold value, then cause the special-purpose processor to perform subsequent cryptographic operations related to the data storage operation to the exclusion of the CPU; and
otherwise, perform the subsequent cryptographic operations related to the data storage operation on the CPU to the exclusion of the special-purpose processor.

19. An apparatus comprising:
a general-purpose central processing unit (CPU);
a special-purpose processor optimized for performing vector-based calculations; and
memory, the memory storing a set of instructions, which, when performed by the CPU cause the CPU to:
cause the special-purpose processor to perform sequence detection operations associated with a set of data storage READ operations, each data storage READ operation of the set of data storage READ operations being directed to one data storage device of a data storage system, including sending a signal to the CPU indicating whether or not a particular data storage READ operation of the set of data storage READ operations is in-sequence with previous data storage READ operations of the set of data storage READ operations; and if the CPU receives a signal from the special-purpose processor indicating that the particular data storage READ operation is in-sequence with previous data storage READ operations, then send the particular data storage READ operation from the CPU to a same port of the plurality of ports which processed the previous data storage READ operations; and if the CPU does not receive a signal from the special-purpose processor indicating that the particular data storage READ operation is in-sequence with previous data storage READ operations, then send the particular data storage READ operation to a port of the plurality of ports based only on load-balancing selection criteria.

20. The apparatus of claim 19 wherein:

the special-purpose processor is a graphics processing unit (GPU) installed on an add-in graphics card connected to the CPU via a general-purpose bus; and the GPU is configured to, when caused by the CPU to perform the sequence detection operations:
- send block-start values of the particular data storage READ operation and previous data storage READ operations from the CPU to the GPU via the general-purpose bus;
- calculate, in parallel, a set of n−1 slopes from a set of n input points on a 2-dimensional graph, plotting operation numbers against block-start values;
- perform, in parallel, a smoothing operation across the set of slopes to form a set of smoothed slopes; and
- evaluate the sequentiality of the set of n input points based on the set of smoothed slopes.

21. The method of claim 2 wherein performing the cryptographic operations related to the data storage operation on the special-purpose processor includes performing the following steps on the GPU:
- segmenting data of the data storage operation into a plurality of multi-word blocks;
- sending one multi-word block of the plurality of multi-word blocks to a processing elements of a plurality of processing element of the GPU;
- cryptographically processing a plurality of words of the multi-word block in parallel within the processing element of the plurality of processing elements of the GPU by applying a single cryptographic operation to each word of the plurality of words simultaneously.

* * * * *